UNITED STATES PATENT OFFICE.

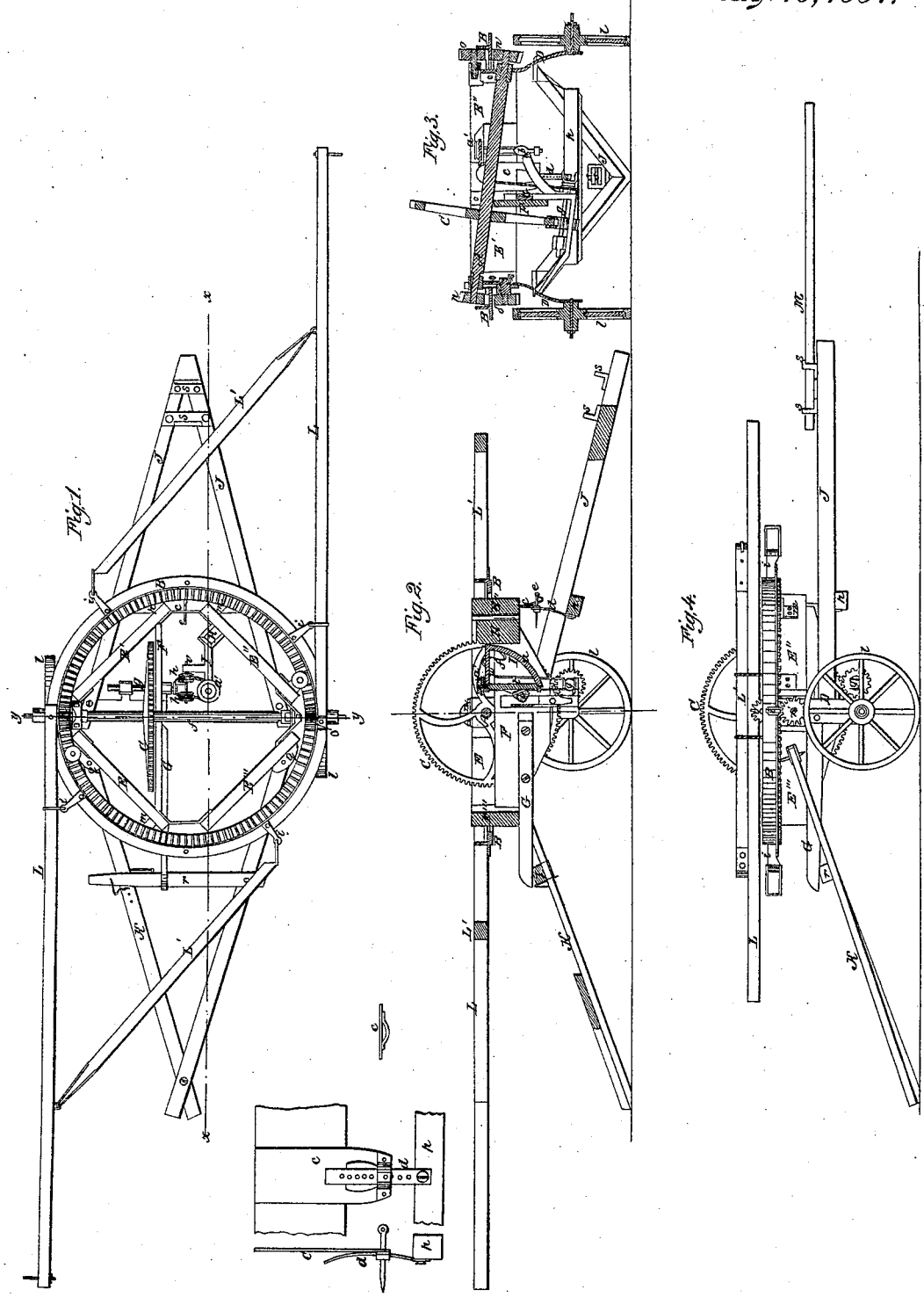

DANIEL WOODBURY, OF ROCHESTER, NEW YORK.

PORTABLE HORSE-POWER.

Specification of Letters Patent No. 18,028, dated August 18, 1857.

*To all whom it may concern:*

Be it known that I, DANIEL WOODBURY, of Rochester, in the county of Monroe and State of New York, have invented an Improved Portable Horse-Power; and I do hereby declare that the following is a full and exact description thereof, reference being had to the accompanying drawings, making a part of this specification, Figure 1 being a top view of said horse-power; Fig. 3, a vertical section in the line $y$ $y$ of Fig. 1, and Fig. 4 is a side elevation of my improved horse-power when its respective parts are so arranged that oxen or horses may be attached to it for the purpose of transporting it from place to place.

The frame of my improved portable horse-power is composed of the timbers E, E′, E″, E‴, which are united to each other by means of suitable metallic fastenings,—as shown in the drawings. The plates D, D, which connect the outer ends of each pair of the frame timbers, (E, E′, E″, E‴,) descend a considerable distance below said timbers; and near the lower ends of said plates, outwardly projecting bearing journals are combined therewith which are received into the hubs of the supporting and transporting wheels $l$, $l$. The after ends of the side pieces J, J, of a triangular frame, are pivoted to the aforesaid supporting plates D, D, of the frame of my horse-power.

The plate $c$, which connects the forward ends of the frame timbers E, and E‴, descends a short distance below said timbers and terminates in a laterally perforated vertical aperture which receives the curved and perforated hinged arm $d$, that rises from the cross-piece $p$, of the triangular frame J, J. The said curved and perforated arm $d$, is of sufficient length to enable the horse-power frame to be adjusted to a horizontal position when the forward end of the triangular frame J, J, may fall to the lowest position that the varying surface of the ground will ever admit of. The said perforated arm $d$, may be retained in any desired position within the aperture of the connecting plate $c$, by means of the pin $e$, or other suitable device.

A longitudinal timber F, is firmly combined with the frame timbers E, E′, and descends a portion of its width below the lower edges of said timbers. A lever G, which has a curved under surface, is firmly secured to the timber F, and projects rearwardly therefrom underneath the frame timber E.

The forward ends of the connected bars K, K, are hinged to the timbers E, E‴, of the horse-power frame; and the connected after ends of said bars rest upon the ground. The cross-bar $r$, which passes under the outer end of the lever G, is hinged at one end to one of the inclined bars K, and the opposite end of said bar $r$, may be moved up or down the surface of the opposite inclined bar K, and be secured in any desired position thereupon by means of a pin inserted in one of the apertures in said inclined bar. It will therefore be perceived that when the outer extremity of the frame J, J, is resting upon the ground, the horse-power frame may be adjusted to a perfectly horizontal position and securely held in that position by means of the above described adjustable fastenings which serve to connect the rear side of said frame with the inclined bars K, K, and the front side of said frame with the jointed frame J, J. When it is desired to transport the said horse-power to a different location, the after fastening bar $r$, must be moved downward a short distance so as to allow the bars K, K, to drag freely upon the ground; then, after removing the pin $e$, from its retaining position, the forward end of the frame J, J, may be elevated, a tongue M, may be inserted within the staples $s$, $s$, and a team may be attached thereto for the purpose of supplying the requisite transporting power. While the horse power is being transported from place to place, the aftermost hinged bars K, K, in connection with their cross-bar $r$, and the rearwardly projecting lever G, serve to protect the horse power from being tilted over backward.

The actuating levers L, L, and their braces L′, L′, are combined with the double faced toothed wheel B, by means of suitable looped brackets $i$, $i$, or their equivalents, substantially as represented in the drawings. When the horse-power is to be transported from one place to another, the said actuating levers L, L, may be removed from their fastenings and be secured to the top of the horse-power frame, as represented in Fig. 4.

The pinion $n$, on one end of the shaft A, gears into the teeth on the upper side of the driving wheel B, and the pinion $n'$, on the opposite end of said shaft, gears into the teeth on the under side of said wheel. Opposite the said pinions $n$, and $n'$, the pinions $o$ and $o'$, gear into the teeth of the driving wheel B, which pinions, work on pins projecting from the plates D, D, and serve to steady the movements of said driving wheel and keep its teeth in gear with the teeth of the said pinions $n$, $n'$, on the shaft A. The toothed wheel C, on the shaft A, gears into a pinion on the shaft $g$.

A many-armed bracket I, is firmly secured to the offset H, on the inner side of the timber E″, of the horse-power frame. A vertical governor shaft $t$, works in apertures within the arms $u$, $u$, of said bracket, and a horizontal spindle projecting from the arm $v$, of said bracket, carries the grooved pulleys $h$, $h$. A round band passes from the pulley $a'$, on the upper end of the governor shaft $t$, to the aforesaid grooved pulleys $h$, $h$, and thence descends and embraces a grooved pulley on the shaft $g$. A spring $f$, combined with the upper arm $u$, of the bracket I, may be composed of some sonorous material or may be connected with a bell. The handle of the hanging hammer $b$, which is hinged to the governor shaft $t$, is of such a length that when too great a velocity is imparted to the driving wheel of the machine, it will elevate the said hammer to such a height that it will strike against the said spring $f$, and thereby admonish the operator to diminish the speed of the machine.

Having thus fully described my improved horse-power, what I claim therein as new and desire to secure by Letters Patent, is—

Poising the frame of said horse-power upon a pair of journals or spindles which are received into the hubs of suitable transporting wheels when the said frame is combined with the jointed bars K, K, and the jointed frame J, J, substantially in the manner and for the purpose herein set forth.

The above specification of my improved horse power signed this 4th day of April, 1856.

DANIEL WOODBURY.

Witnesses:
 Z. C. ROBBINS,
 G. W. ADAMS.